US007218761B2

(12) United States Patent
McClurg et al.

(10) Patent No.: US 7,218,761 B2
(45) Date of Patent: May 15, 2007

(54) SYSTEM FOR OBTAINING PRINT AND OTHER HAND CHARACTERISTIC INFORMATION USING A NON-PLANAR PRISM

(75) Inventors: George W McClurg, Jensen Beach, FL (US); John F Carver, Palm City, FL (US); Frank L Ebright, Hobe Sound, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 56 days.

(21) Appl. No.: 10/725,537

(22) Filed: Dec. 3, 2003

(65) Prior Publication Data

US 2004/0109591 A1 Jun. 10, 2004

Related U.S. Application Data

(60) Provisional application No. 60/491,537, filed on Aug. 1, 2003, provisional application No. 60/431,240, filed on Dec. 6, 2002.

(51) Int. Cl.
*G06K 9/00* (2006.01)
*G03B 21/28* (2006.01)
(52) U.S. Cl. .................. 382/127; 382/124; 353/81
(58) Field of Classification Search ........ 382/115–127; 353/81
See application file for complete search history.

(56) References Cited

U.S. PATENT DOCUMENTS 1,501,979 A 7/1924 Willson (Continued)

FOREIGN PATENT DOCUMENTS

| JP | 3-161884 | 7/1991 |
| WO | WO 96/17480 A2 | 6/1996 |
| WO | WO 96/17480 A3 | 6/1996 |

OTHER PUBLICATIONS

International Search Report from PCT Appl. No. PCT/US03/38644, filed Dec. 5, 2003, 3 pages.

(Continued)

*Primary Examiner*—Matthew C. Bella
*Assistant Examiner*—Wesley Tucker
(74) *Attorney, Agent, or Firm*—Sterne, Kessler, Goldstein & Fox P.L.L.C.

(57) ABSTRACT

A system and method include a non-planar prism and a scanning imaging system configured to locate and/or scan all or part of a hand print for one or more hands positioned on a curved portion of the non-planar prism. The curved portion can be symmetrical about an axis of symmetry of the non-planar prism. Typically, a print pattern on a palm pocket, a writer's palm, or the like, is hard to capture on a flat surface. In contrast, the non-planar prism of the present invention provides a form so that a print pattern on the palm pocket, writer's palm, or the like, can be captured. Print patterns or different parts of a hand (e.g., fingertips and a writer's palm) are also more easily captured using the non-planar prism. Hand and/or finger characteristic data can also be captured, for example hand geometry (e.g., finger lengths and spacing between fingers). The scanning imaging system can be stationary or it can be rotated along an arcuate scan path about a centerline axis of the optical element. During the rotation, an image of the full hand print (including thenar, hypothenar, inter digital, palm heel, palm pocket, and fingertips) and/or full palm and finger prints can be captured. The optical element can also include a calibration area (e.g., target) that can be used to calibrate the measuring device during each scan and/or be captured with the image for future quality control of the captured image.

38 Claims, 15 Drawing Sheets

U.S. PATENT DOCUMENTS

| | | |
|---|---|---|
| 2,146,662 A | 2/1939 | Van Albada |
| 2,184,858 A | 12/1939 | Goodman |
| 3,054,854 A | 9/1962 | Neasham |
| 3,282,152 A | 11/1966 | Myer |
| 3,333,502 A | 8/1967 | Flanagan |
| 3,511,571 A | 5/1970 | Ogle |
| 3,581,282 A | 5/1971 | Altman |
| 3,648,240 A | 3/1972 | Jacoby et al. |
| 3,716,301 A | 2/1973 | Caulfield et al. |
| 3,765,018 A | 10/1973 | Heard et al. |
| 3,804,524 A | 4/1974 | Jocoy et al. |
| 3,806,706 A | 4/1974 | Hasslinger et al. |
| 3,882,462 A | 5/1975 | McMahon |
| 4,032,889 A | 6/1977 | Nassimbene |
| 4,106,078 A | 8/1978 | Inoue |
| 4,128,837 A | 12/1978 | Page |
| 4,180,306 A | 12/1979 | Duhrkoop et al. |
| 4,206,441 A | 6/1980 | Kondo |
| 4,206,556 A | 6/1980 | Sabo et al. |
| 4,215,274 A | 7/1980 | Segall |
| 4,357,597 A | 11/1982 | Butler |
| 4,387,365 A | 6/1983 | Berry et al. |
| 4,414,684 A | 11/1983 | Blonder |
| 4,420,261 A | 12/1983 | Barlow et al. |
| 4,461,576 A | 7/1984 | King |
| 4,467,545 A | 8/1984 | Shaw, Jr. |
| 4,578,793 A | 3/1986 | Kane et al. |
| 4,611,881 A | 9/1986 | Schmidt et al. |
| 4,637,718 A | 1/1987 | Kirchner et al. |
| 4,684,802 A * | 8/1987 | Hakenewerth et al. ...... 250/235 |
| 4,688,092 A | 8/1987 | Kamel et al. |
| 4,701,960 A | 10/1987 | Scott |
| 4,720,869 A | 1/1988 | Wadia |
| 4,736,203 A | 4/1988 | Sidlauskas |
| 4,736,436 A | 4/1988 | Yasukawa et al. |
| 4,751,660 A | 6/1988 | Hedley |
| 4,751,759 A | 6/1988 | Zoell |
| 4,774,516 A | 9/1988 | Henri et al. |
| 4,783,167 A | 11/1988 | Schiller et al. |
| 4,790,025 A | 12/1988 | Inoue et al. |
| 4,792,226 A | 12/1988 | Fishbine et al. |
| 4,794,260 A * | 12/1988 | Asano et al. ............ 250/458.1 |
| 4,805,117 A | 2/1989 | Fiore et al. |
| 4,821,118 A * | 4/1989 | Lafreniere ................... 348/156 |
| 4,925,300 A | 5/1990 | Rachlin |
| 5,140,469 A | 8/1992 | Lamarre et al. |
| 5,146,102 A | 9/1992 | Higuchi et al. |
| 5,225,924 A | 7/1993 | Ogawa et al. |
| 5,243,459 A | 9/1993 | Winston et al. |
| 5,249,370 A | 10/1993 | Stanger et al. |
| 5,307,264 A | 4/1994 | Waggener et al. |
| 5,309,274 A | 5/1994 | Akanabe |
| 5,313,306 A | 5/1994 | Kuban et al. |
| 5,367,399 A | 11/1994 | Kramer |
| 5,377,002 A | 12/1994 | Malin et al. |
| 5,440,428 A | 8/1995 | Hegg et al. |
| 5,452,135 A | 9/1995 | Maki et al. |
| 5,469,289 A | 11/1995 | Iwao et al. |
| 5,526,436 A * | 6/1996 | Sekiya ....................... 382/115 |
| 5,528,355 A * | 6/1996 | Maase et al. ................. 356/71 |
| 5,588,097 A | 12/1996 | Ono et al. |
| 5,610,751 A | 3/1997 | Sweeney et al. |
| 5,629,764 A | 5/1997 | Bahuguna et al. |
| 5,638,461 A | 6/1997 | Fridge |
| 5,650,842 A | 7/1997 | Maase et al. |
| 5,677,763 A | 10/1997 | Redmond |
| 5,677,782 A | 10/1997 | Peng |
| 5,699,186 A | 12/1997 | Richard |
| 5,745,591 A * | 4/1998 | Feldman ..................... 382/115 |
| 5,761,330 A | 6/1998 | Stoianov et al. |
| 5,777,751 A | 7/1998 | Ward |
| 5,796,426 A | 8/1998 | Gullichsen et al. |
| 5,798,923 A | 8/1998 | Laskowski |
| 5,825,474 A * | 10/1998 | Maase ......................... 356/71 |
| 5,892,599 A | 4/1999 | Bahuguna |
| 5,937,102 A | 8/1999 | Jin |
| 6,021,007 A | 2/2000 | Murtha |
| 6,038,332 A * | 3/2000 | Fishbine et al. ............ 382/115 |
| 6,041,134 A | 3/2000 | Merjanian |
| 6,046,867 A | 4/2000 | Rana |
| 6,175,407 B1 | 1/2001 | Sartor |
| 6,198,429 B1 | 3/2001 | Fujikawa et al. |
| 6,198,836 B1 | 3/2001 | Hauke |
| 6,243,488 B1 | 6/2001 | Penna |
| 6,341,028 B1 | 1/2002 | Bahuguna et al. |
| 6,373,969 B1 | 4/2002 | Adler |
| 6,394,356 B1 | 5/2002 | Zagami |
| 6,411,441 B1 | 6/2002 | Videen |
| 6,415,064 B1 | 7/2002 | Oh |
| 6,424,470 B1 | 7/2002 | Lindner |
| 6,459,451 B2 | 10/2002 | Driscoll, Jr. et al. |
| 6,466,686 B2 | 10/2002 | Senior |
| 6,496,608 B1 | 12/2002 | Chui |
| 6,616,065 B2 | 9/2003 | Martin |
| 6,658,164 B1 | 12/2003 | Irving et al. |
| 6,928,195 B2 | 8/2005 | Scott et al. |
| 7,081,951 B2 | 7/2006 | Carver et al. |
| 2002/0049714 A1 | 4/2002 | Yamazaki et al. |
| 2002/0141620 A1 | 10/2002 | Monden |
| 2003/0012417 A1 | 1/2003 | Hamid |
| 2003/0099022 A1 | 5/2003 | Karin et al. |
| 2003/0142856 A1 | 7/2003 | McClurg et al. |
| 2003/0197853 A1 | 10/2003 | Fenrich |
| 2003/0206287 A1 | 11/2003 | McClurg et al. |
| 2004/0109245 A1 | 6/2004 | McClurg et al. |
| 2004/0109589 A1 | 6/2004 | McClurg et al. |
| 2004/0114785 A1 | 6/2004 | McClurg et al. |
| 2004/0114786 A1 | 6/2004 | Cannon et al. |
| 2005/0105078 A1 | 5/2005 | Carver et al. |

OTHER PUBLICATIONS

English Abstract for Japanese Patent Publication No. 3-161884, published Jul. 7, 1991, 1 page, from http://v3.espacenet.com/.

McClurg et al., U.S. Appl. No. 10/725,543, filed Dec. 3, 2003, entitled "System Having a Rotating Optical System and a Non-Planar Prism that are Used to Obtain Print and Other Hand Characteristic Information," 41 pages.

International Search Report from PCT Appl. No. PCT/US03/38536, filed Dec. 4, 2003, 4 pages.

* cited by examiner

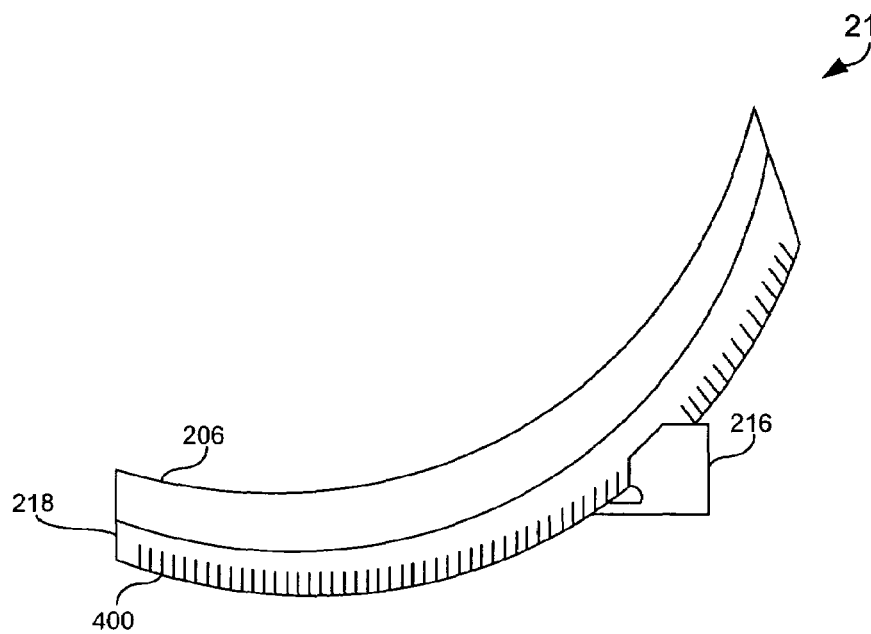
FIG. 4
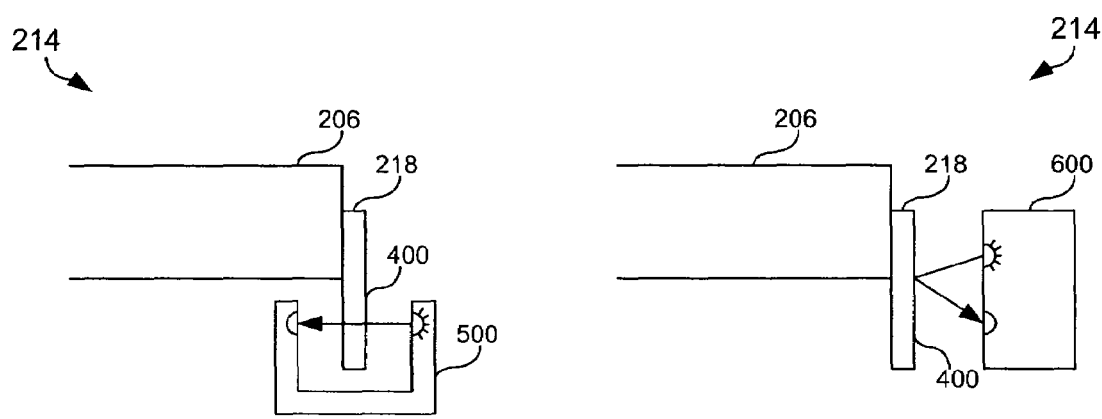
FIG. 5   FIG. 6
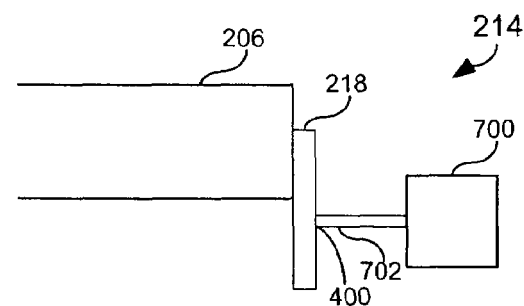
FIG. 7

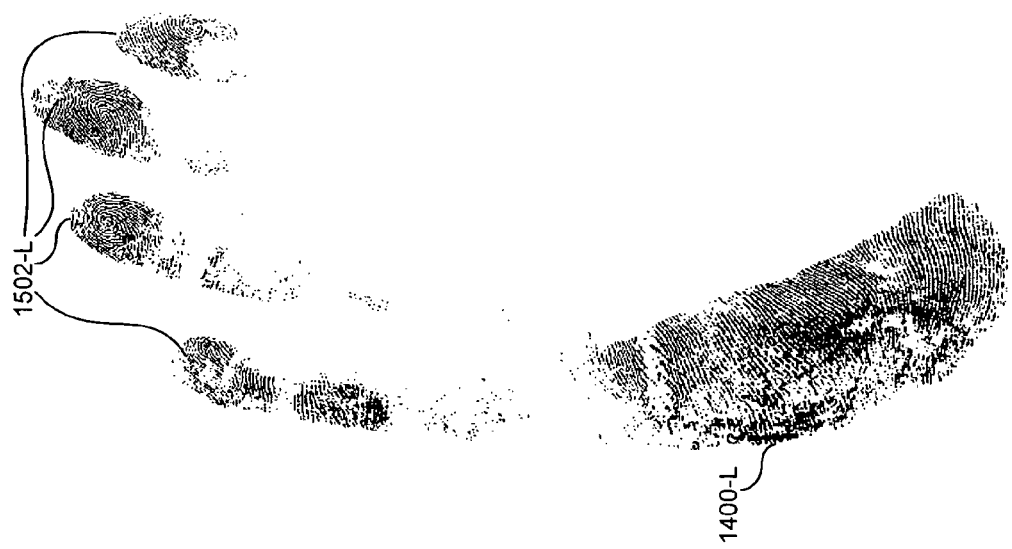
FIG. 15

SYSTEM FOR OBTAINING PRINT AND OTHER HAND CHARACTERISTIC INFORMATION USING A NON-PLANAR PRISM

CROSS REFERENCE TO RELATED APPLICATIONS

This application claims the benefit of U.S. Provisional Application No. 60/431,240, filed Dec. 6, 2002, and U.S. Provisional Application No. 60/491,537, filed Aug. 1, 2003, both of which are incorporated herein by reference in their entireties.

BACKGROUND OF THE INVENTION

1. Field of the Invention

The present invention pertains to biometric imaging technology, and in particular, to live scanning of prints.

2. Background Art

Biometrics is a science involving the analysis of biological characteristics. Biometric imaging captures a measurable characteristic of a human being for identity and other related purposes. Print capture and recognition is an important biometric technology. Law enforcement, banking, voting, and other industries increasingly rely upon prints as a biometric to store, recognize or verify identity. Generally, a biometric is a measurable, physical characteristic or personal behavior trait used to recognize the identity, or verify the claimed identity, of a person who has a biometric reference template (e.g., data that represents a biometric measurement) on file.

Biometric imaging systems may include, but are not limited to, print imaging systems. Print imaging systems can capture images of prints on thumbs, fingers, palms, toes, feet, and/or hands. Such print imaging systems are also referred to as scanners or live scanners. Conventional live scanners use light to detect an image of a fingerprint and/or palm print. For example, one or more fingers or a palm are placed on a platen. An illumination source illuminates the underside of the platen. An image representative of valleys, ridges, or other characteristics of a fingerprint or a palm print is then detected by an image sensor, such as a solid-state camera.

One problem with conventional palm live scanner systems is that a palm naturally curves, while a typical platen has a flat planar surface upon which a palm is placed. Thus, there is a chance that not all portions of the palm print will be imaged during scanning. If this occurs, biometric information can be lost.

Also, in many live scanners, increasing the surface area of a flat platen requires a significant increase in the size of a camera being used to detect images on the platen. Large area cameras or sets of cameras can dramatically increase cost and complexity. As a result, the size of the surface area of a flat platen is limited in many live scanners to a size of an average palm or smaller.

Therefore, what is needed is a biometric capture system that includes an optical device shaped to better conform to a palm of a user's hand.

BRIEF SUMMARY OF THE INVENTION

Embodiments of the present invention provide a system for capturing biometric data including a non-planar prism configured to be illuminated by a light source and a scanning optical system configured to capture image data of a portion of a person interacting with the non-planar prism.

Other embodiments of the present invention provide a system for capturing biometric data including a non-planar prism configured to totally internally reflect light from a curved portion, such that the totally internally reflected light exists a planar portion and an image capturing system that receives the totally internally reflected light and generated image data therefrom of a person interacting with the curved portion.

In one aspect of the present invention, the non planar prism includes a curved portion and a planar portion. The curved portion is configured to receive a biometric object (e.g., one or more hands) of the person on a first surface and to totally internally reflect light beams from the light source from a second surface. The planar portion is coupled at an angle to the curved portion. The totally internally reflected light exits through the planar portion, after which it is received by the scanning optical system.

In one aspect of the present invention a surface area of the curved portion is substantially larger than a surface area of the planar portion.

Through the use of the curved surface of the non-planar prism, which is shaped to better conform to a palm of a user's hand, and the scanning imaging system the system can capture complete hand and palm prints, writer's palm prints, writer's palm, prints in combination with fingertips, and other prints for one or two hands, as is discussed is detail below.

Another embodiment fo the present invention provides a method for capturing an image representing a print pattern of the hand of a person interacting with a non-planar platen of a prism, as well as capturing calibration data from target images, and generating image information including both the captured image and the captured calibration data.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
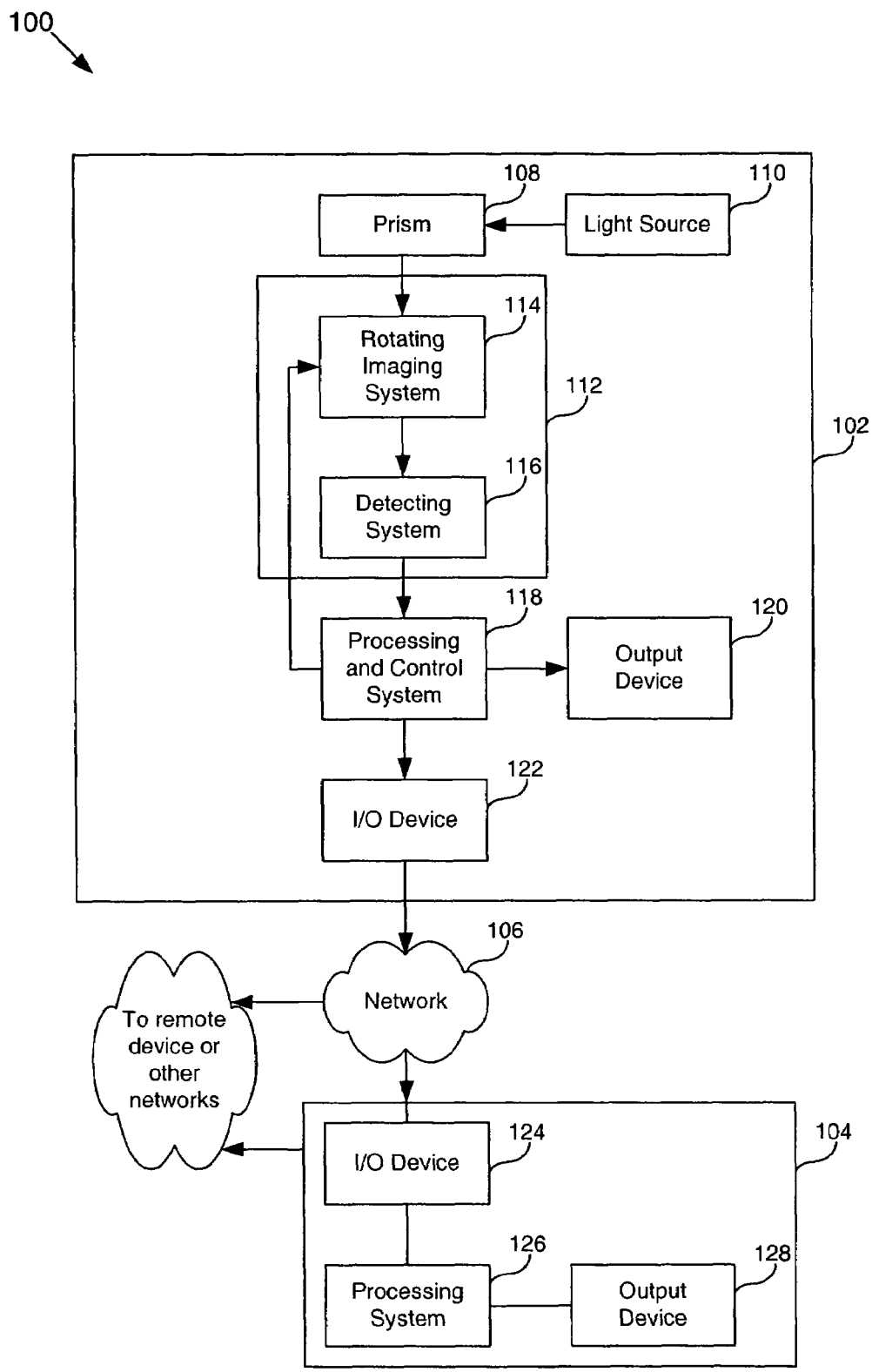
FIG. 1 shows a system for capturing biometric data according to an embodiment of the present invention.
Figure 2:
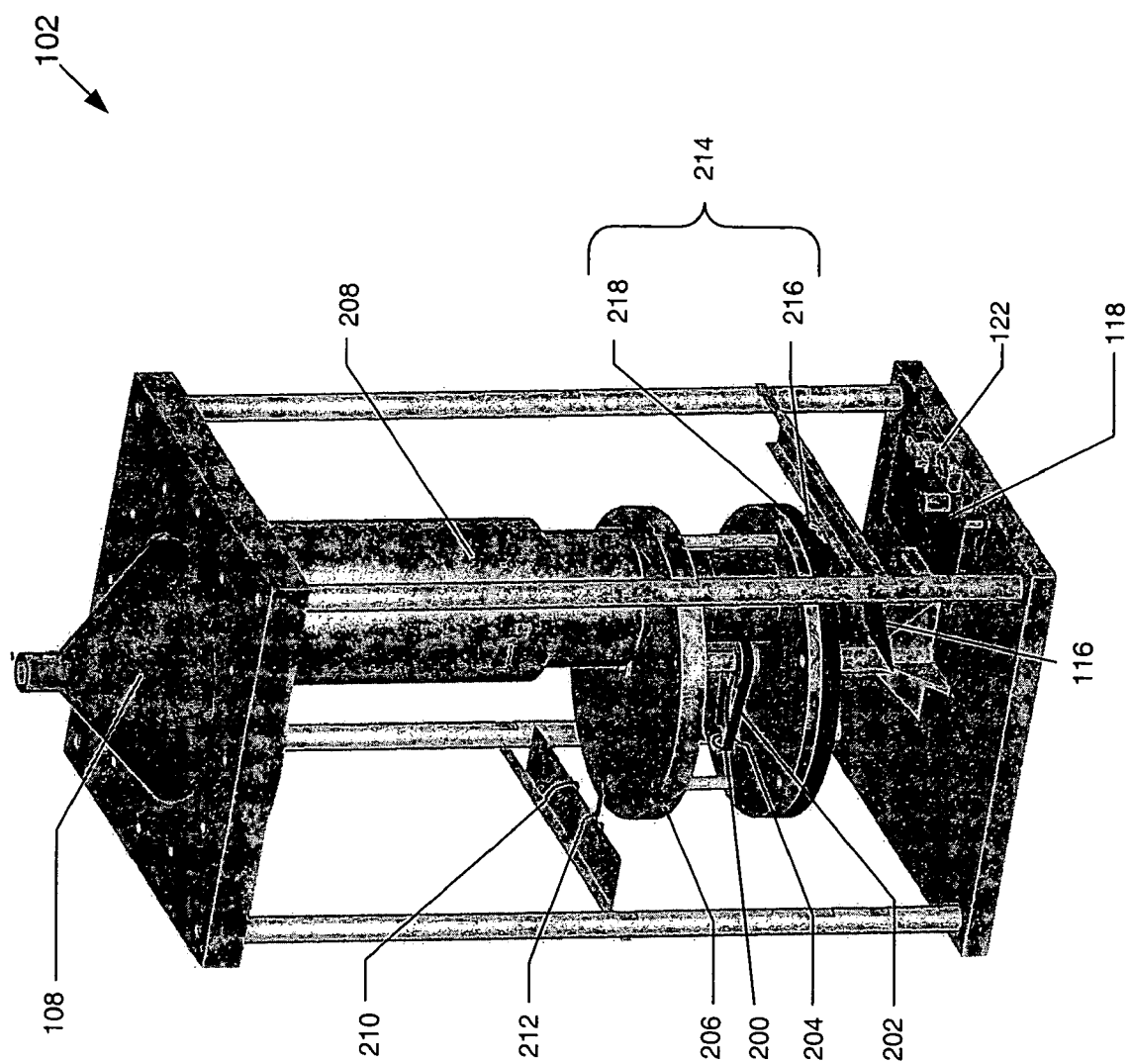
FIG. 2 shows a local section of the system in FIG. 1 according to an embodiment of the present invention.

FIGS. 4, 5, 6, and 7 show an encoder section of the system in FIGS. 1 and 2 according to various embodiments of the present invention.

Figure 8:
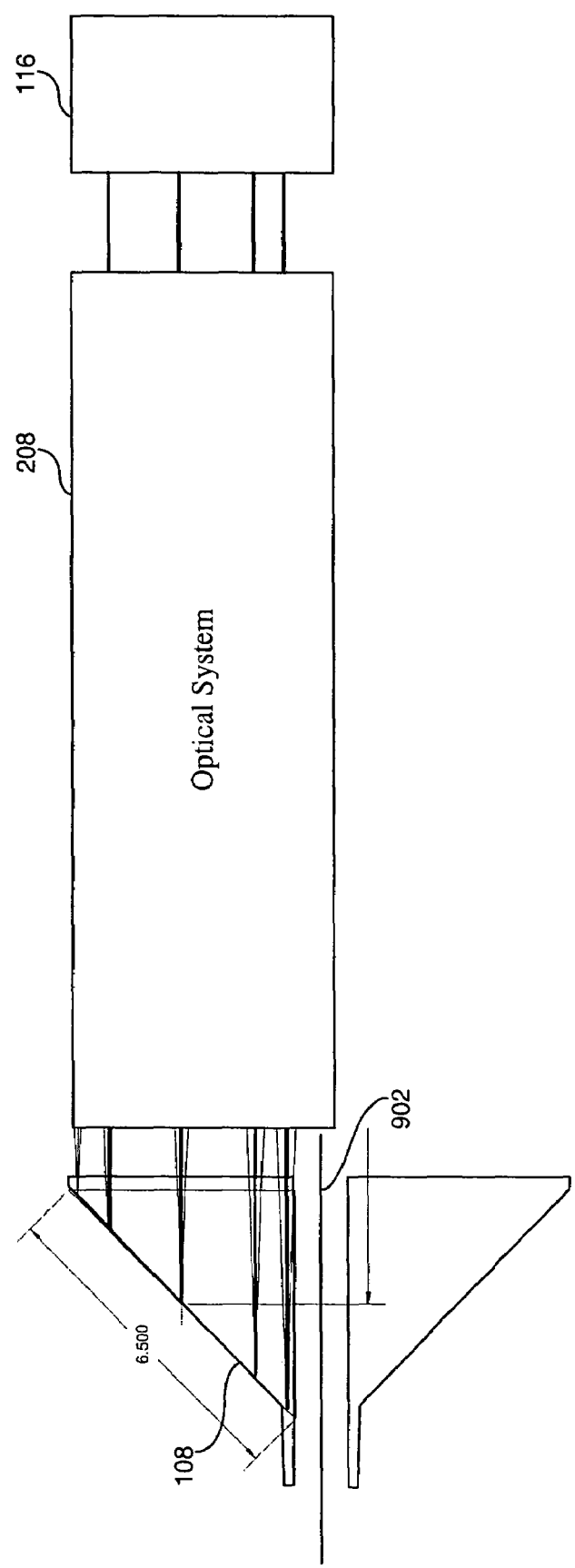

FIG. 8 shows a prism and optical system in the system of FIGS. 1 and 2 according to an embodiment of the present invention.

Figure 9:
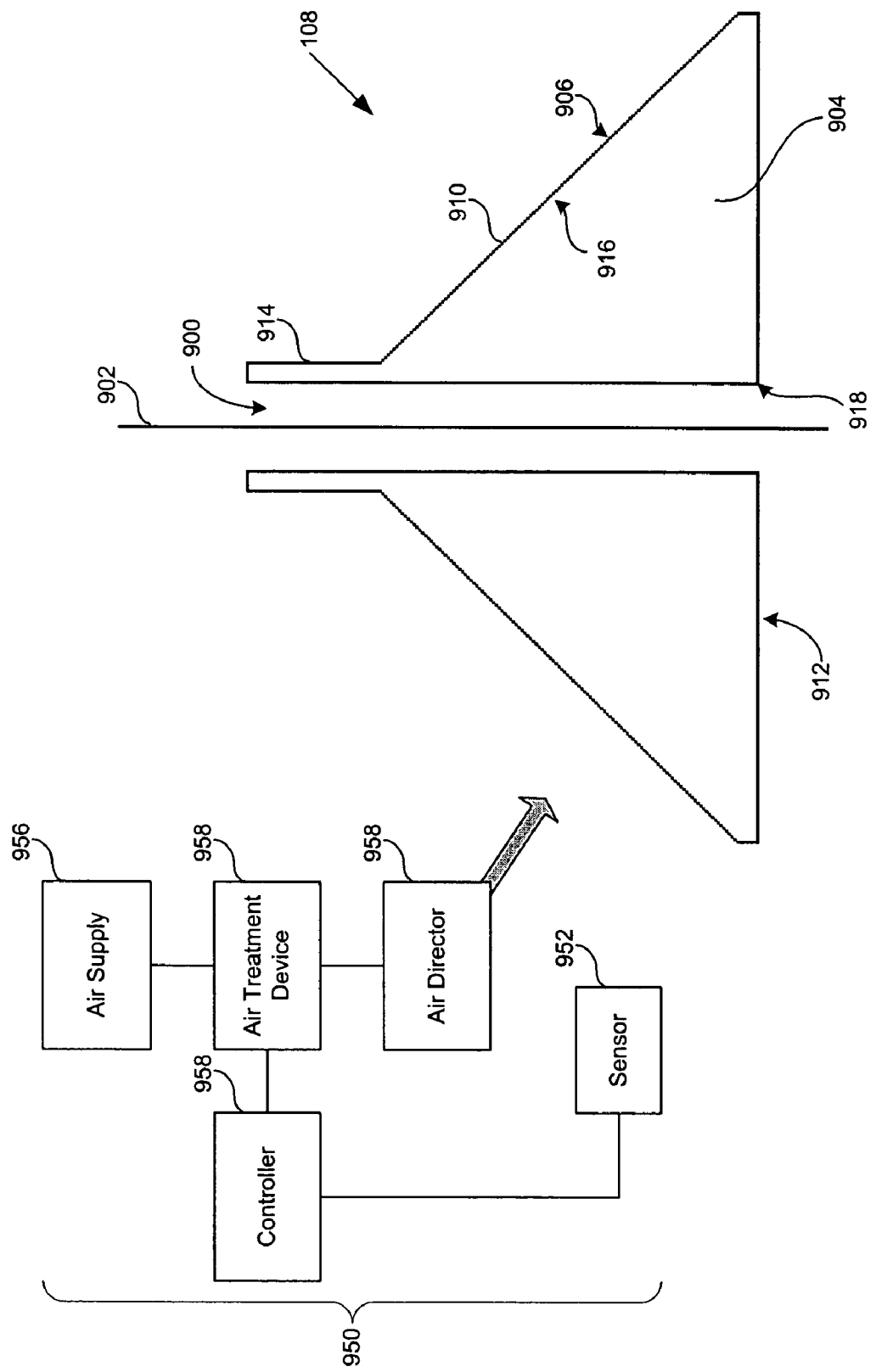

FIG. 9 shows a prism according to an embodiment of the present invention.

Figure 10:
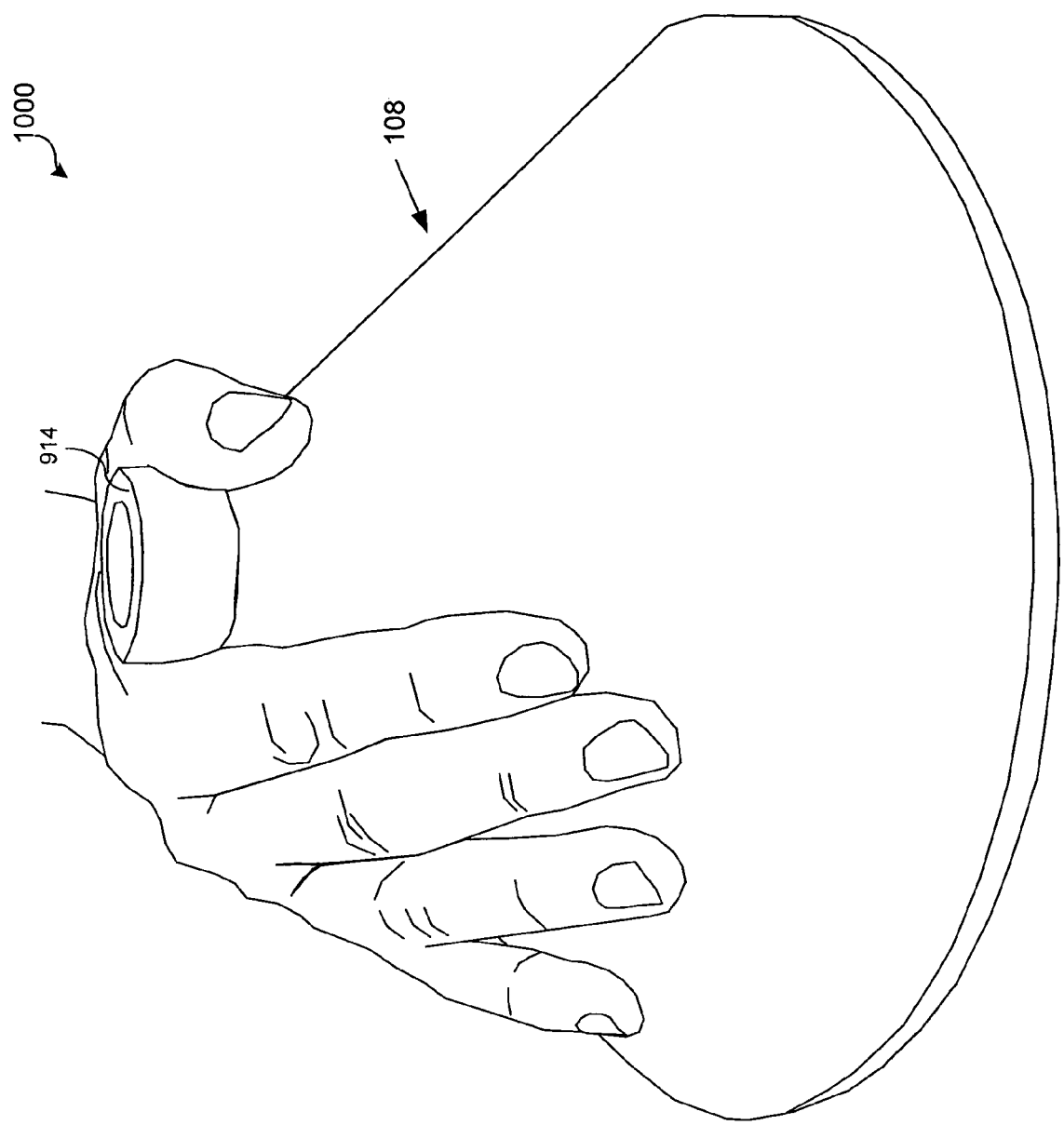
Figure 11:
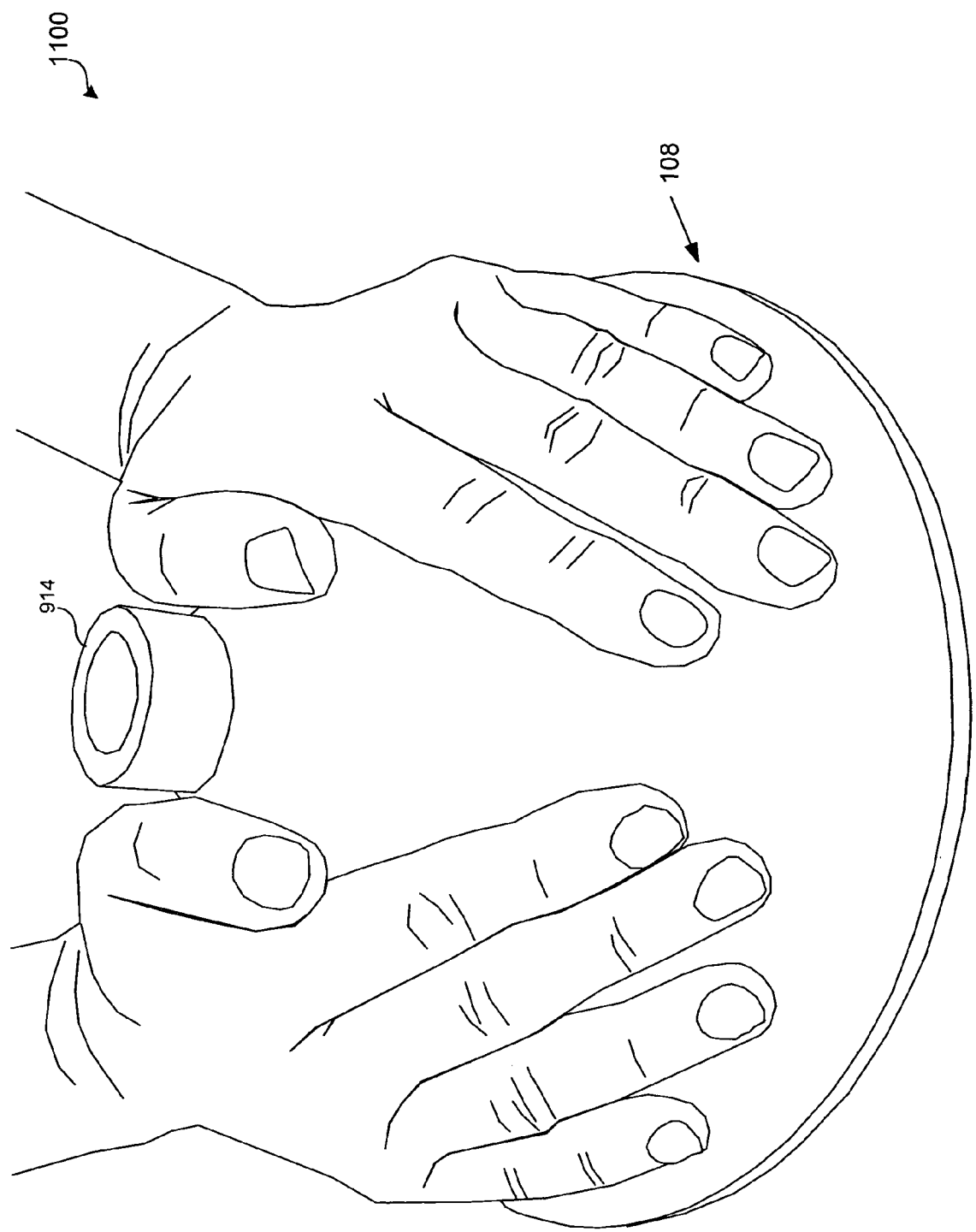

FIGS. 10–11 illustrate how a subject places one or both hands, respectively, on a prism according to various embodiments of the present invention.

Figure 12:
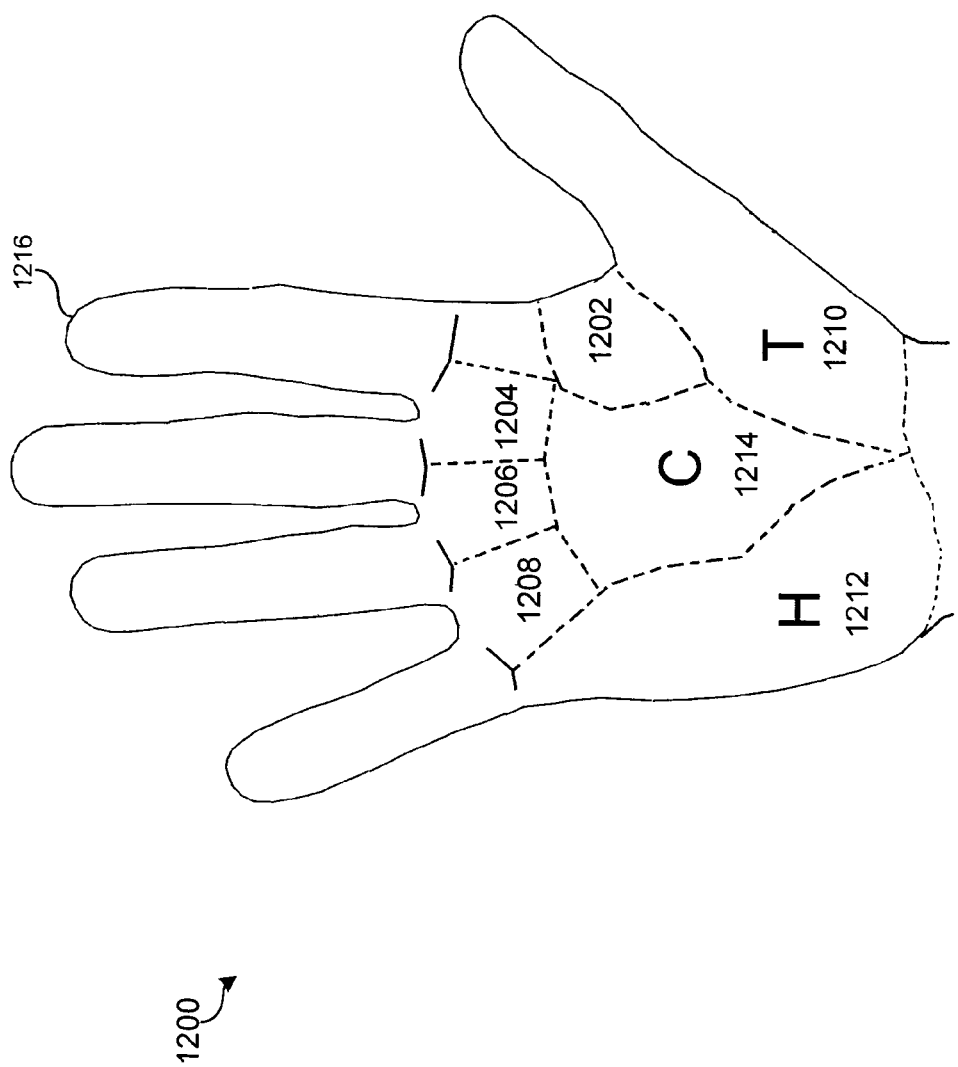
Figure 13:
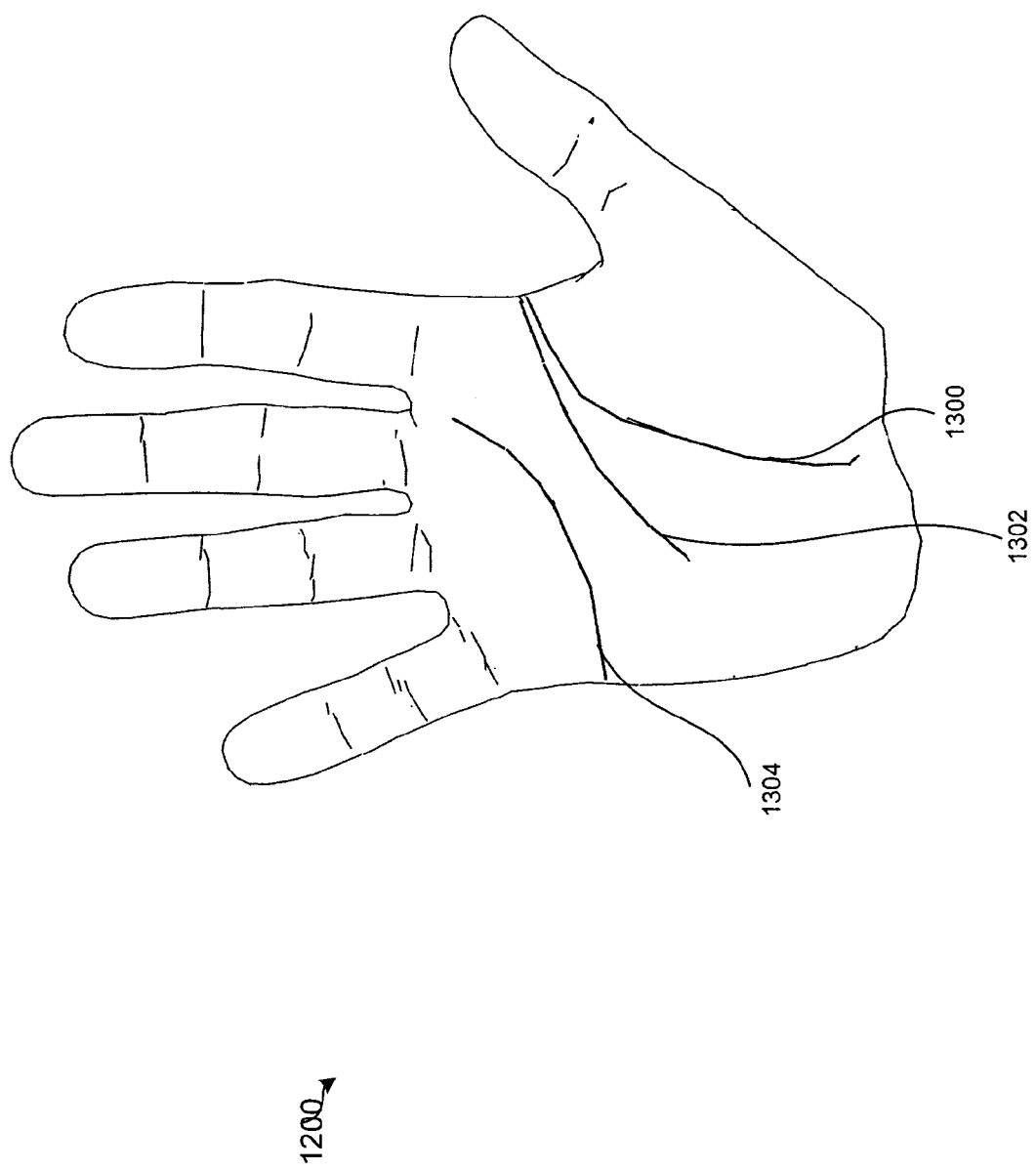
Figure 14:
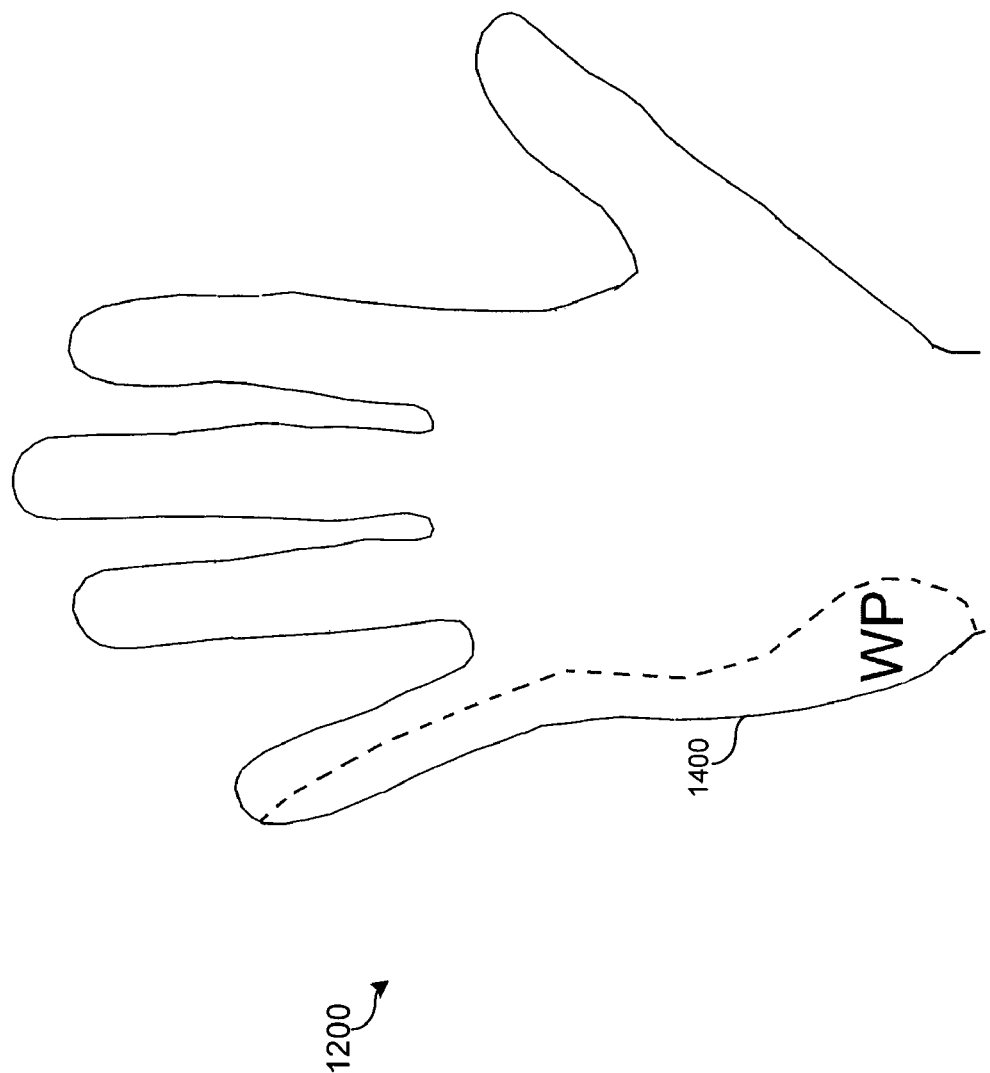

FIGS. 12–14 show various parts of a hand used during image and biometric analysis according to embodiments of the present invention.

FIG. 15 shows an image of a print pattern of writer's palms and fingertips captured according to an embodiment of the present invention.

Figure 16:
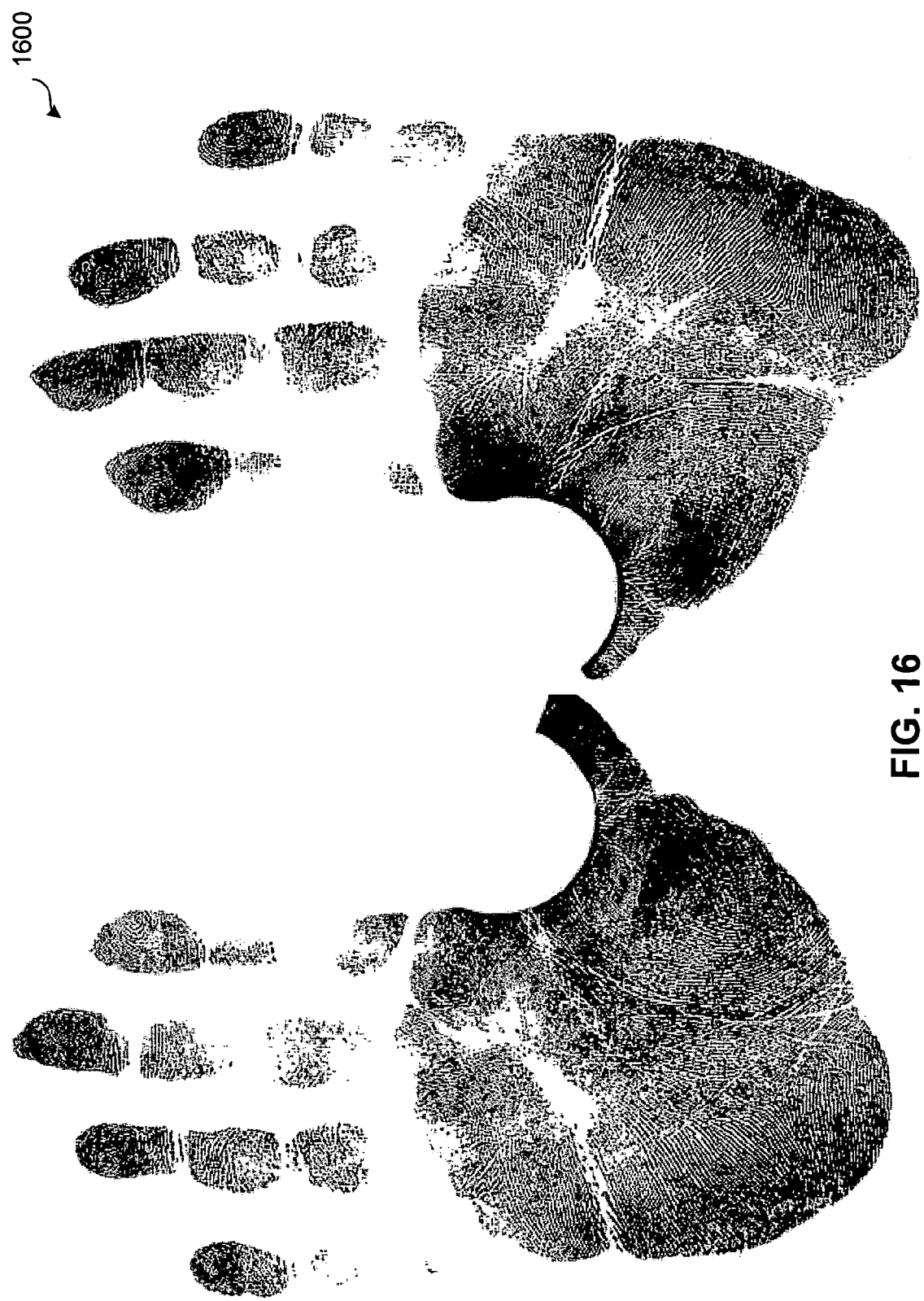

FIG. 16 show an image of a print pattern of left and right hand prints taken during different scans captured according to an embodiment of the present invention.

Figure 17:
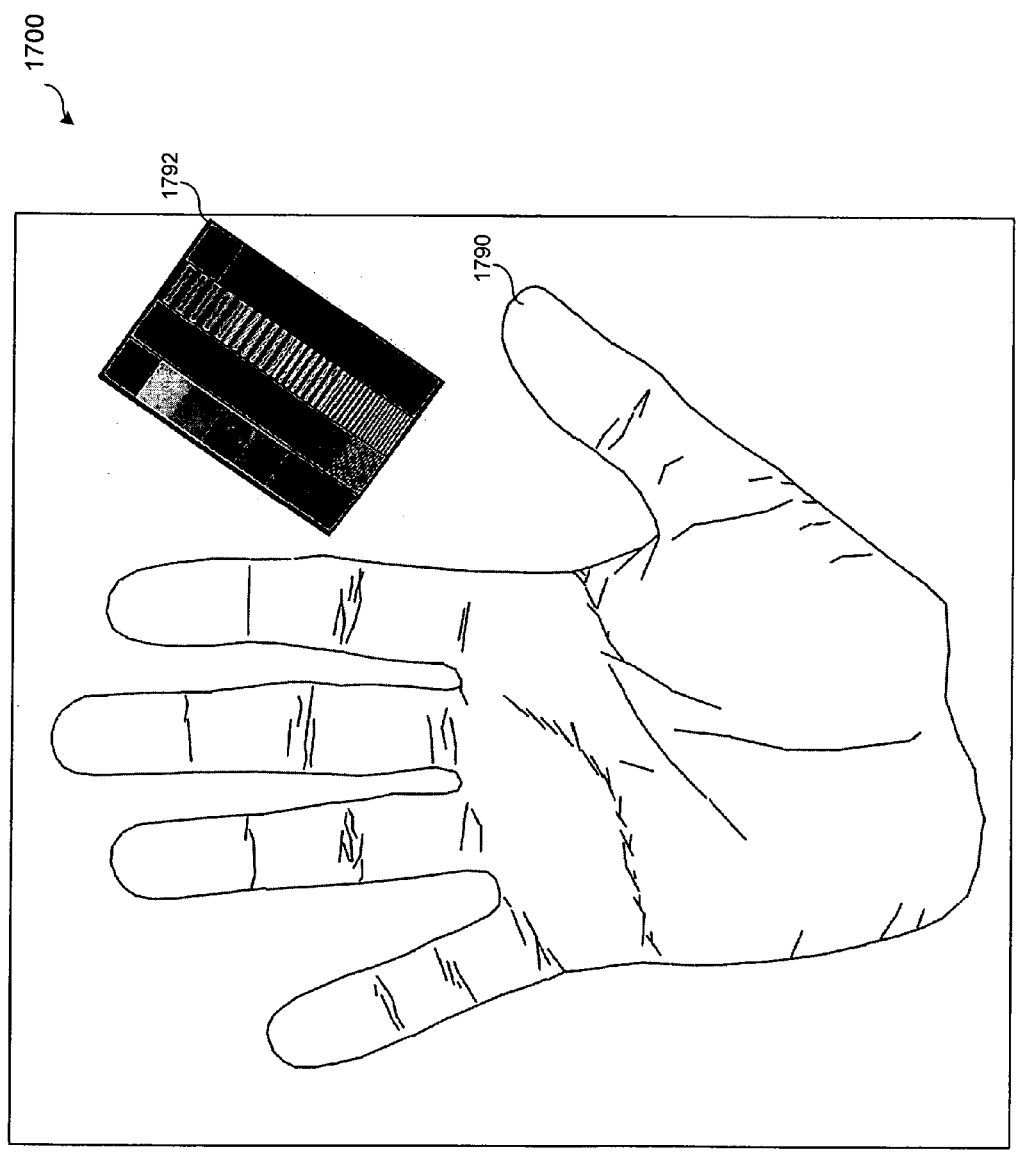

FIG. 17 shows an exemplary image including hand print data and calibration data according to an embodiment of the present invention.

Figure 18:
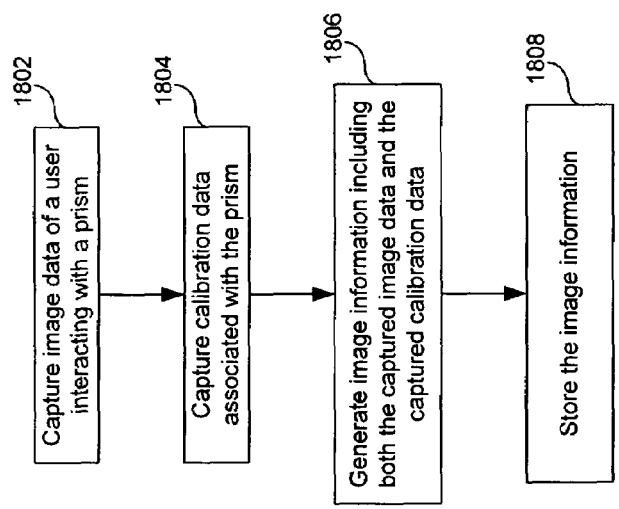

FIG. 18 shows a flowchart depicting a method of capturing hand print and calibration data according to an embodiment of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Embodiments of the present invention provide a system including a non-planar prism and a scanning imaging system configured to locate and/or scan all or part of a hand print for one or more hands positioned on a curved portion of the non-planar prism. The curved portion can be symmetrical about an axis of symmetry of the non-planar prism. Typically, a print pattern on palm pocket, writer's palm, or the like, is hard to capture on a flat surface. In contrast, the non-planar prism of the present invention provides a form so that a print pattern on the palm pocket, writer's palm, or the like, can be captured. Print patterns or different parts of a hand (e.g., fingertips and a writer's palm) are also more easily captured using the non-planar prism. Hand and/or finger characteristic data can also be captured, for example hand geometry (e.g., finger lengths and spacing between fingers).

The scanning imaging system can be stationary or it can be rotated along an arcuate scan path about a centerline axis of the optical element. During the rotation, an image of the full hand print (including thenar, hypothenar, inter digital, palm heel, palm pocket, and fingertips) and/or full palm and finger prints can be captured by the measuring portion. This combination of a curved portion on the non-planar prism (e.g., a conical prism) and arcuate scan path provides a relative large platen surface area upon which to place a print pattern without requiring a correspondingly large area camera or set of cameras.

The optical element can also include an alignment device (e.g., a hand-locating feature) than can be used to position a hand based on a point between a thumb and an index finger, between any other two fingers, a full hand on one side of the alignment device, both hands with each hand on either side of the alignment device, or to capture writer's palm and/or writer's palm and fingertip images.

The optical element can also include a calibration area (e.g., target) that can be used to check calibration or perform calibration of the measuring device during each scan and/or be captured with the image for future quality control (e.g., calibration of a device displaying the image) of the captured image.

A communications system might be used to transmit captured biometric data through an interface to a remote processing system.

Terminology

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "print" can be any type of print including, but not limited to, a print of all or part of one or more fingers, palms, toes, foot, hand, etc. A print can also be a rolled print, a flat print, or a slap print.

The term "hand print," as used herein according to the present invention, can include any region on a hand having a print pattern, including thenar and hypothenar regions of the palm, interdigital regions, palm heel, palm pocket, writer's palm, and/or fingertips.

The term "biometric data" or "biometric information" throughout the specification can be data representative of a biometric, a digital or other image of a biometric (e.g., raw image data, a bitmap, binary, or other file), extracted digital or other information relating to the biometric (such as minutiae), etc.

The term "live scan" refers to a capture of any type of print image made by a print scanner.

A platen can be movable or stationary depending upon the particular type of scanner and, the type of print being captured by the scanner.

The terms "biometric imaging system," "scanner," "live scanner," "live print scanner," "fingerprint scanner," and "print scanner" are used interchangeably, and refer to any type of scanner which can obtain an image of a print pattern on all or part of one or more fingers, palms, toes, feet, hands, etc. in a live scan. The obtained images can be combined in any format including, but not limited to, an FBI, state, or international tenprint format.

The terms "finger characteristic information" and "hand characteristics information" are used to describe hand geometry information, such as finger and thumb lengths and spacing and minutiae extracted from print information.

The term "non-planar prism" includes a prism having a non-planar platen surface that extends around all or part of an axis of the prism, and whose non-planar platen surface allows for total internal reflection of light. A non-planar platen surface allows a print pattern (such as, a print pattern on a hand, a palm pocket, a writer's palm, a writer's palm with fingertips), or other hand characteristic images, to be captured. An example of this type of prism can be an approximately conically-shaped prism. Other examples can be approximately spherically shaped prisms, curved prisms, and the like.

Overall System

FIG. 1 shows a system 100 for capturing image data representing biometric data according to an embodiment of the present invention. System 100 includes a local section or unit 102 and a remote section or unit 104 (e.g., a computer, or the like) that can be coupled via a network 106. Network 106 can be any type of network or combination of networks known in the art, such as a packet-switched network with wired or wireless links, an intranet, the Internet, an Ethernet, or the like. Example links are links having a FIREWIRE or USB network interface. The remote section 104 may be in a same area as the local section 102, such that local and remote refer to an approximate distance they are relative to a final processing device of the image data (e.g., print or hand characteristic data).

Local section 102 includes a non-planar prism 108, having a non-planar (e.g., curved) portion that is symmetrical about an axis of symmetry of the prism, positioned between a light source 110 and a scanning imaging system 112. Scanning imaging system 112 can include a rotating imaging system 114 and a detecting system 116 (e.g., a camera). Scanning imaging system 112 captures image data from parts of a hand (not shown) interacting with non-planar prism 108. The image data is processed in processing and control system 118, which can generate one or both of an output signal and a communications signal, which can include the image data. The output signal can be transmitted to an optional output device 120, while the communications signal can be transmitted to input/output (I/O) device 122. The I/O device 122 then sends the output signal to remote section 104 over network(s) 106.

It is to be appreciated that in other embodiments scanning imaging system 112 can include a stationary lens sized to capture all light leaving non-planar prism 108 that has been totally internally reflected from a section of the non-planar prism 108 proximate an area in which a person (not shown) interacts with the non-planar prism 108 and a stationary large area array sensor.

Remote section 104 includes an I/O device 124, a processing system 126, and optionally an output device 128. Processing system 126 can be used to process the image data to generate biometric data. For example, extraction and matching operations can be performed on the image data to produce biometric data. Once completed, results can be displayed or audibly indicated using output device 128. It is to be appreciated that other processes known in the biometric arts can also be performed in remote section 104. All of these additional processes are contemplated within the scope of the present invention.

It is to be appreciated that network 106 and/or remote device 104 can be coupled to other peripheral devices and/or networks, which is contemplated within the scope of the present invention.

FIG. 2 shows local section 102 of system 100 according to an embodiment of the present invention. Rotating imaging system 114 can include a motor 200, belt 202, and pulley 204 that rotates rotating stage 206, optical enclosure 208, and detecting system 116 around an axis of symmetry of non-planar prism 108. During rotation, positioning of rotating imaging system 114 can be monitored by controller 118 using signals from stop position sensor 210, home position sensor 212, and/or encoder system 214. In this example, encoder system 214 is an optical position encoder receiving light on sensor 216 after the light interacts with strip 218.

Although certain dimensions and/or types of devices are shown in this figure, these are not meant to be limiting, only exemplary. It is to be appreciated that different sizes or types of elements can be used within the scope of the present invention.

It is to be appreciated that, although not shown, various other types of devices can be used to rotate rotating imaging system 114. For example, an electromagnetic device (e.g., stepper motor), a resilient device, or any other device known to one or ordinary skill in the art are all contemplated within the scope of the present invention. Thus, a motor/belt/pulley system is shown merely as one exemplary way to rotate rotating optical system 114.

Figure 3:
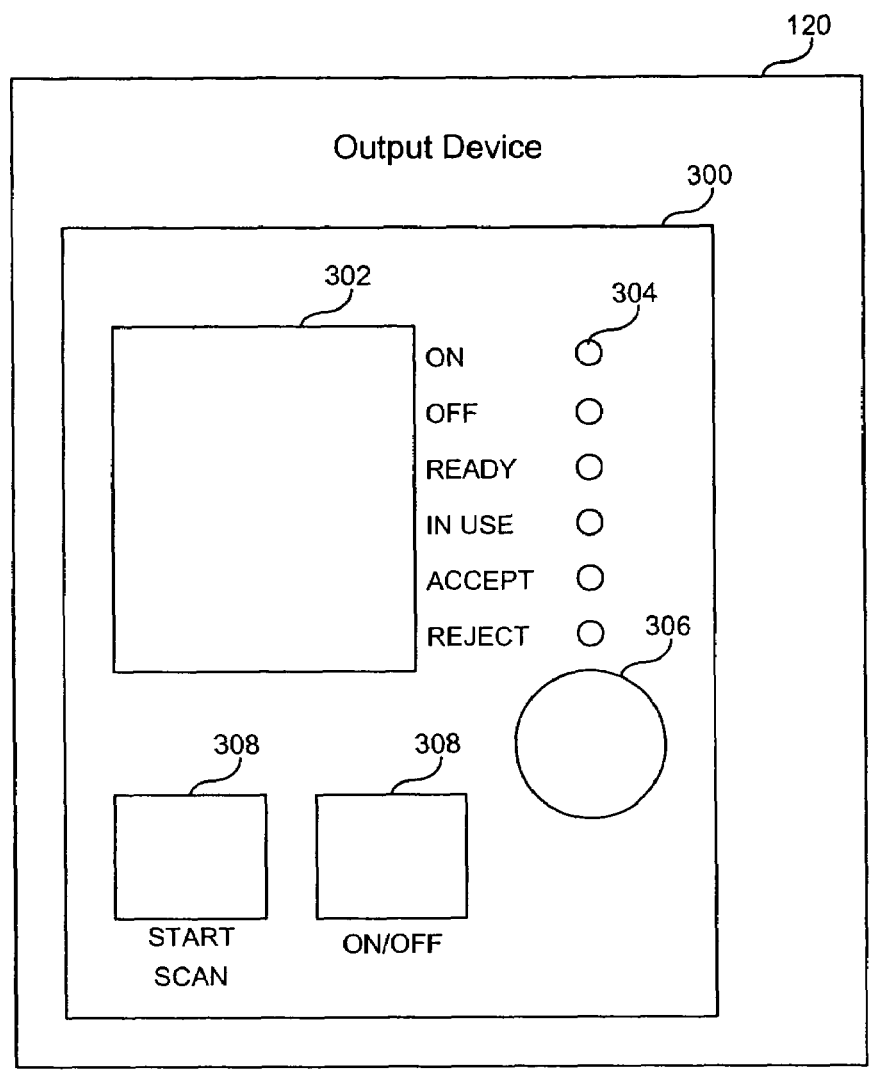
FIG. 3 shows an indicator section of the system in FIGS. 1 and 2 according to an embodiment of the present invention.

FIG. 3 shows a portion 300 of output device 120 according to an embodiment of the present invention. Portion 300 can include one or more of the following indicators: a display 302 (e.g., an LCD display), a plurality of visual indicators 304 (e.g., LEDs), and/or audio device 306. Portion 300 can also include input devices 308.

For example, depending on the functionality provided in local system 102, display 302 can output results from an image quality capture routine or an extract and match procedure performed using processing system 126 (e.g., a good scan, an identity of an individual scanned, etc.). Display 302 can also be used to give instructions to an operator as to what needs to done prior to, during, and subsequent to the scanning. Display 302 can further be used to indicate status of the scanning and whether it was successfully completed or not. In another example, display 302 can be a touch panel display that allows an operator to enter information into system 100 or control system 100 using a control device on the display.

LEDs 304, as shown in this example, can provide information about system 100 being ON, OFF, READY, or IN USE. LEDs 304 can also provide information regarding a quality of the scan, for example whether the images obtained are acceptable or rejected.

Audio device 306 can give audio indications of the status of system 100 shown through LEDs 304. Audio device 306 can also be used to provide pre-stored instructions for an operator, that might be in response to a status of system 100 or a quality of the scanned image.

Input devices 308 can be buttons, mechanical interfaces, electronic interfaces, etc. that can be used to control system 100 and or a scanning operation (e.g., an ON/OFF button, a start scan button, or the like).

FIGS. 4, 5, 6, and 7 show zoomed in views of portions of encoder section 214 according to various embodiments of the present invention. Any type of position encoder can be used including, but not limited to, optical, magnetic, or mechanized position encoders with incremental or absolute position encoding.

FIG. 4 shows an encoder strip 218 having an incremental encoder scale 400 that is coupled to rotating stage 206.

FIG. 5 shows a transmission type optical encoder 500. Light passes through scale 400 of encoder strip 218 to be detected by encoder 500 while stage 206 is rotating.

FIG. 6 shows a reflection type optical encoder 600. Light reflects from scale 400 of strip 218 to be detected by encoder 600 while stage 206 is rotating.

FIG. 7 shows a mechanical encoder 700. An extension 702 (e.g., rod or shaft) interacts with scale 400 of strip 218. This interaction can be monitored by encoder 700.

FIG. 8 shows an optical system 208 (e.g., one or more optical elements, lenses, etc.) that can be used to direct an image from prism 108 onto detecting system 116 according to an embodiment of the present invention.

In one embodiment, optical system 208 can include a large optical device (e.g., a lens) that is large enough to direct light from an entire bottom area of prism 108 (e.g., surface 912 shown in FIG. 9 below) onto detecting system 116. In this embodiment, detecting system 116 can be a relatively large area scanner that looks an entire bottom area of non-planar prism 108. This is in contrast to having a rotating radial detecting system that is used to scan light reflecting from surface 916 (FIG. 9) that exists prism 108 through surface 912 (FIG. 9), i.e., light totally internally reflected from prism 108 onto detecting system 116.

In some embodiments process and control system 118 can receive inputs from stop position sensor 210, home position sensor 212, a heater coupled to non-planar prism 108, I/O device 122, and other devices that may be associated with system 100. These inputs can be used to generate various output control signals, for controlling I/O device 122, scanning imaging system 112, and/or other devices that may be associated with system 100. I/O devices 122 and 124 can be FIREWIRE or USB transceivers, or other types of devices as are known in the relevant arts.

Non-Planar Prism

FIG. 9 shows a cross-sectional view of non-planar prism 108 according to one embodiment of the present invention. Non-planar prism 108 has an opening 900 running along an axis of symmetry 902. Opening 900 is defined within an area 904 of non-planar prism 108 that has a non-planar first section 910 and a substantially planar second section 912. A top portion of non-planar prism 108 can contain a guide or positioning device 914, which is used to properly place a subject's hand (not shown) during biometric image capture.

Non-planar prism 108 can be manufactured from transparent, translucent, and/or colored acrylic, glass, plastic, or the like, and may be coated with various protective coatings, as is known in the relevant arts. If the non-planar prism material is colored, it can be of a color that matches a color of light for a light source being used. A first surface 906 of first section 910 is shaped so as to provide the non-planar aspect to prism 108. As discussed above, the non-planar shape is preferably approximately conical, but can also be curved, spherical, or the like, so long as a second surface 916 provides total internal reflection of incident light.

Platen surface 906 is a surface upon which an object (e.g., hand(s)) having a print is placed. Platen surface 906 can be a surface of non-planar prism 108 or another surface in optical contact with an outside surface of prism 108. For example, platen surface 906 can be a surface of an optical protective layer (e.g., silicone pad) placed on prism 108 at section 910.

In operation, the subject's hand is positioned using positioning device 914 and light enters non-planar prism 108 either from within opening 900 or via an edge 918 of opening 900. The light totally internally reflects from second surface 916, and out second section 912 onto a detector 116 (see FIG. 8).

Through use of the shape shown for non-planar prism 108, substantially all or part of a hand (e.g., thenar and/or hypothenar region of the palm, the "writer's palm," inter digital regions, palm heel, palm pocket, and/or fingertips) can be captured in one or more scans. This is partially because a surface area of section 910 is sized to receive one or more hands wrapped around non-planar prism 108 generally along a direction of a curve.

Accordingly, in embodiments, images with features of up to two hands of a subject can be captured in a single scan.

Other exemplary non-planar prisms can be found in U.S. application Ser. No. 10/725,539 entitled "A Non-Planar Prism Used In A System For Obtaining Print And Other Hand Characteristic Information," which is incorporated by reference herein in its entirety.

In an optional embodiment, a air treatment system 950 can be located proximate prism 108. Air treatment system 950 can include one or more of the following elements: a sensor 952, a controller, 954, an air supply 956, an air treatment device 958, and a air director 960. It is to be appreciated that although air is used as an exemplary material, other materials now known or developed in the future, which can perform the same function as air, are also contemplated within the scope of the present invention. Sensor 952 can be a temperature sensor or any other type of sensor. Air supply 956 can be a clear air supply, an ambient air supply, or the like. Air treatment device 958 can be an air conditioner, a heater, or the like. Air director can be a blower, a recirculation pump, or the like.

Through directing (e.g., blowing) of air, moisture around prism 108 or a hand(s) interacting therewith can be reduced or substantially eliminated (e.g., dehumidified). This can allow for reduction or elimination of a halo in a captured image. The air can be either treated (e.g., heated, conditioned, etc.) air from air supply 956 that is treated using device 958 or ambient air, which may or may not be treated using device 958.

In one embodiment, air treatment system 950 directs a relatively large volume of air, which can dry a hand or platen (i.e., remove or evaporate moisture). In another embodiment, air treatment system 950 directs a relatively small volume of air at a prism, which prevents condensation (e.g., in humid environments) from forming on a platen when a finger or hand is placed thereon. This reduces or prevents a halo from appearing in a captured image.

In other configurations, air treatment system 950 can be used to allow for ionization of surface 906 to reduce static electricity on surface 906, which can reduce direct particles.

In still other configurations, air treatment system 950 can be used to sanitize surface 906 in order to reduce bacteria in or around the surface.

In still other configurations, sensor 952 can be used to monitor a temperature at, inside, or around prism 108. Controller 954 generate a control signal transmitted to air treatment device 958 to most appropriately treat prism 108. While in other configurations prism 108 may not require monitoring, and air treatment is done with sensing any conditions in or around prism 108.

FIGS. 10–11 illustrate how a subject places one 1000 or both 1100 hands on non-planar prism 108. As can be seen, positioning device 914 in used is either case to properly align the hand 1000 or hands 1100 on non-planar prism 108 for image capture.

Captured Hand Sections

FIGS. 12–16 show examples of various aspects of a hand or palm that can be imaged in order to generate biometric information or data. These are merely exemplary areas of a hand or palm. Other areas can be imaged, as would be apparent to a person skilled in the art given this description. These examples are not meant to limit the invention.

FIG. 12 shows sections 1202–1214 of a palm 1200 of a hand 1216 that can be imaged, according to embodiments of the present invention. Section 1202 is a first interdigital area. Section 1204 is a second interdigital area. Section 1206 is a third interdigital area. Section 1208 is a fourth interdigital area. Section 1210 is a thenar area. Section 1212 is a hypothenar area. Section 1214 is a central area or palm pocket.

FIG. 13 shows creases 1300–1304 of palm 1200 that can be included in an image, according to embodiments of the present invention. Crease 1300 is a thenar crease. Crease 1302 is a proximal transverse crease. Crease 1304 is a distal transverse crease.

FIG. 14 shows a writer's palm or writer's palm hypothenar area 1400 of palm 1200. Writer's Palm 1400 includes a print pattern (ridges and valleys) that extends from palm hypothenar area 1212 up along a side of the hand.

FIG. 15 shows images 1500 of right (R) and left (L) hand writer's palms 1400 and fingertips 1502, according to an embodiment of the present invention.

According to a feature of the present invention, writer's palm 1400 and fingertips 1502 can be captured in a single scan because of the shape of non-planar prism 108. Unlike conventional planar platen surfaces, writer's palm 1400 and fingertips 1502 can be placed on a non-planar prism 108 at the same time during a live scan without requiring any difficult or awkward contortions of a persons hand.

FIG. 16 shows images 1600 of right and left hand prints captured during two scans of scanner 112 according to an embodiment of the present invention.

As described above, the non-planar surface of the non-planar prism allows for a pocket of a palm of hand to make contact with a platen and break a surface total internal reflection of the non-planar prism. This creates a mechanism for capturing a high contrast round palm print image. According to further embodiments, a print image can also be captured that includes both a palm print and one or more fingerprints on a same hand. In this way, other biometric information can be extracted from the print images, such as, the association of the palm and fingerprints as belonging to the same hand, distance information on the distance from palm locations to finger locations, etc. According to still further embodiments, both a hand print and target/calibration information can be captured at a same time and stored together.

FIG. 17 shows an exemplary image 1700 including image data of both a hand print and/or hand characteristic information 1790 and calibration data from a target 1792. Target 1792 can be a calibration target or other information desired in a particular application. Capturing calibration data can be used to reproduce substantially exactly the image as originally captured. This is especially helpful as data is achieved and subsequently accessed at different times by different systems and applications. Such system and applications can access both the image data and calibration data in an original scan enable succesful, high-quality reproduction or analysis of the captured image data with appropriate calibration. Also, calibration data can be used to ensure system 100 is calibrated to capture a consistent and accurate image 1700. For example 100 can be calibrated each time scanning system 112 scans calibration data on non-planar prism 108.

FIG. 18 shows a flowchart depicting a method 1800 of capturing hand print, hand characteristic information, and calibration data according to an embodiment of the present invention. In step 1802, image data representing biometric and/or hand characteristic data of a user interacting with a non-planar prism is captured. In step 1804, calibration data associated with the non-planar prism is captured. In step 1806, image information is generated than can include both the captured image data and the captured calibration data. In step 1808, the image information is stored.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for capturing biometric data, comprising:
a non-planar prism comprising a substantially conical portion, a top portion, and a planar portion, the non-planar prism configured to be illuminated by a light source; and
a scanning optical system configured to capture image data of a print area of a hand of a person interacting with the substantially conical portion of the non-planar prism, such that the top portion is located between a thumb of the hand and an index finger of the hand, the thumb of the hand interacts with a first side of the substantially conical portion, and the fingers of the hand interact with a second, opposite side of the substantially conical portion during the capture of the image data;
wherein the image data represents substantially all of the print area of the hand of the person, while the hand is stationary on the substantially conical portion of the non-planar prism.

2. The system of claim 1, wherein:
the substantially conical portion is configured to receive the print area of the hand of the person on a first, outside surface and to totally internally reflect light beams from the light source from a second, inside surface; and
the planar portion is coupled at an angle to the substantially conical portion through which the totally internally reflected light exits to be received by the scanning optical system.

3. The system of claim 1, wherein the scanning optical system rotates around an axis of symmetry of the non-planar prism.

4. The system of claim 1, wherein an element in the scanning optical system rotates a received image to perform the scanning.

5. The system of claim 4, wherein the element is an image rotator element selected from the group consisting of a dove prism and a Pachan prism.

6. The system of claim 1, wherein the scanning optical system moves along an arcuate path to capture radial scan line images transmitted through a base of the non-planar prism.

7. The system of claim 1, further comprising a processing system that converts the captured image data into transmittable information that is transmitted by a communications system.

8. The system of claim 7, wherein the communications system comprises a FIREWIRE system.

9. The system of claim 1, further comprising a processing system comprising a means for converting the captured image data from a first coordinate system into image data in a second coordinate system.

10. The system of claim 9, wherein the first coordinate system is a surface of the non-planar prism and the second coordinate system is a planar coordinate system.

11. The system of claim 1, further comprising an encoder configured to encode a position of the scanning optical system and to generate encoder data.

12. The system of claim 1, wherein the scanning optical system comprises a control system configured to control a motor, belt, and pulley system.

13. The system of claim 1, wherein the non-planar prism and the scanning optical system are configured to capture a palm print image as the image data.

14. The system of claim 1, wherein the non-planar prism and the scanning optical system are configured to capture palm print and fingerprint images as the image data.

15. The system of claim 1, wherein the non-planar prism and the scanning optical system are configured to capture both palm print images as the image data.

16. The system of claim 1, wherein the non-planar prism and the scanning optical system are configured to capture both sets of palm print images and fingerprint images as the image data.

17. The system of claim 1, wherein the non-planar prism and the scanning optical system are configured to capture palm print, fingerprint, and target images as the image data.

18. The system of claim 1, wherein the non-planar prism and the scanning optical system are configured to capture a writer's palm image as the image data.

19. The system of claim 1, wherein the non-planar prism and the scanning optical system are configured to capture a writer's palm and fingertip images as the image data.

20. The system of claim 1, wherein the light source is positioned to direct light from the light source to an inside surface of the substantially conical portion of the non-planar prism configured to totally internally reflect the light so that the light exits the planar portion of the non-planar prism.

21. The system of claim 1, wherein:
the substantially conical portion has a surface area sized to receive the print area of the hand or both print areas of both hands of the person; and
the planar portion is located at an angle with respect to the substantially conical portion and has a smaller surface area than the curved portion.

22. The system of claim 1, wherein the light source is positioned within a cylindrical opening running along an axis of symmetry of the prism.

23. The system of claim 1, wherein the light source is positioned proximate a chamfered edge of the prism.

24. The system of claim 1, wherein the system further comprises first and second processing systems that are coupled via a communications system via at least one of an Internet, an Intranet, a hardwire connection, a wireless system, a FIREWIRE transceiver, a USB transceiver, and an Ethernet.

25. The system of claim 1, further comprising an air treatment system positioned proximate the non-planar prism.

26. The system of claim 25, wherein the air treatment system performs one of heating, sanitizing, ionizing, and dehumidifying of the non- planar prism and/or the print area of the hand of the person.

27. A system for capturing biometric data comprising:
a non-planar prism configured to totally internally reflect light from a substantially conical portion of the non-planar prism, such that the totally internally reflected light exits a planar portion of the non-planar prism; and
an image capturing system that receives the totally internally reflected light and generates image data therefrom of a print area of a hand of a person interacting with opposite sides of the substantially conical portion of the non-planar prism, wherein the hand is configured to be positioned using a top portion of the non-planar prism,
wherein the image data represents substantially all of the print area of the hand of the person, while the hand is stationary on the substantially conical portion of the non-planar prism.

28. The system of claim 27, wherein the image capturing system comprises a stationary lens and a stationary large area array.

29. The system of claim 28, wherein the lens is sized to capture all light leaving the non-planar prism that has been totally internally reflected from a section of the non-planar prism proximate an area in which the print area of the hand of the person interacted with the non-planar prism.

30. The system of claim 27, wherein the image capturing system rotates around an axis of symmetry of the non-planar prism.

31. The system of claim 1, wherein the non-planar prism comprises a conical prism.

32. The system of claim 27, wherein the non-planar prism comprises a conical prism.

33. The system of claim 1, wherein the top portion includes a guide extending therefrom, such that the guide is used to properly position the hand on the substantially conical portion.

34. The system of claim 27, wherein the top portion includes a guide extending therefrom, such that the guide is used to properly position the hand on the substantially conical portion.

35. The system of claim 17, wherein the target images are configured to be obtained from a calibration target associated with the non-planar prism.

36. The system of claim 35, wherein captured image data from the calibration target is configured to be used for subsequent proper displaying of the palm print and fingerprint image.

37. The system of claim 35, wherein captured image data from the calibration target is configured to be used to determine quality of the palm print and fingerprint image.

38. The system of claim 17, wherein image data from palm print, fingerprint, and target images are captured simultaneously, and stored together.

* * * * *

UNITED STATES PATENT AND TRADEMARK OFFICE
CERTIFICATE OF CORRECTION

| | |
|---|---|
| PATENT NO. | : 7,218,761 B2 |
| APPLICATION NO. | : 10/725537 |
| DATED | : May 15, 2007 |
| INVENTOR(S) | : George W. McClurg et al. |

It is certified that error appears in the above-identified patent and that said Letters Patent is hereby corrected as shown below:

Column 2, line 31 please replace "embodiment fo the present" with --embodiment of the present--.

Signed and Sealed this

Second Day of October, 2007

JON W. DUDAS
*Director of the United States Patent and Trademark Office*